United States Patent
Tironi et al.

(10) Patent No.: US 8,733,517 B2
(45) Date of Patent: May 27, 2014

(54) BRAKE DISC VENTILATED

(75) Inventors: Giovanni Mario Tironi, Bergamo (IT); Simone Biondo, Milan (IT); Stefano Medici, Bergamo (IT); Michele Donati, Bergamo (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 13/388,967

(22) PCT Filed: Jul. 20, 2010

(86) PCT No.: PCT/IB2010/053311
§ 371 (c)(1),
(2), (4) Date: Feb. 3, 2012

(87) PCT Pub. No.: WO2011/015962
PCT Pub. Date: Feb. 10, 2011

(65) Prior Publication Data
US 2012/0125725 A1  May 24, 2012

(30) Foreign Application Priority Data
Aug. 7, 2009 (IT) .............................. PD2009A0240

(51) Int. Cl.
*F16D 65/10* (2006.01)
(52) U.S. Cl.
USPC .............................. 188/218 XL; 188/264 AA
(58) Field of Classification Search
USPC .... 188/18 A, 218 R, 218 XL, 264 A, 264 AA
See application file for complete search history.

(56) References Cited

U.S. PATENT DOCUMENTS

| | | | |
|---|---|---|---|
| 6,142,267 A * | 11/2000 | Sporzynski et al. | .... 188/218 XL |
| 6,626,273 B1 | 9/2003 | Baumgartner et al. | |
| 7,690,484 B2 | 4/2010 | Oberti et al. | |
| 8,360,213 B2 * | 1/2013 | Biondo et al. | .......... 188/218 XL |
| 2004/0182660 A1 * | 9/2004 | Cavagna et al. | ......... 188/218 XL |
| 2007/0181389 A1 * | 8/2007 | Moore et al. | ............ 188/218 XL |
| 2008/0302615 A1 | 12/2008 | Gey | |
| 2010/0084231 A1 | 4/2010 | Biondo et al. | |
| 2010/0230221 A1 | 9/2010 | Biondo et al. | |

FOREIGN PATENT DOCUMENTS

| | | |
|---|---|---|
| WO | WO 02/081941 | 10/2002 |
| WO | WO 2004/102028 A | 11/2004 |
| WO | WO 2008/135876 A | 11/2008 |
| WO | WO 2008/136032 A | 11/2008 |

OTHER PUBLICATIONS

International Search Report, ISA/EP, Rijswijk, NL, and Written Opinion of the ISA for PCT/IB2010/053311, ISA/EP, Munich, mailed Sep. 23, 2010.

* cited by examiner

*Primary Examiner* — Christopher Schwartz
(74) *Attorney, Agent, or Firm* — Harness, Dickey & Pierce, PLC

(57) ABSTRACT

A brake disc of a rotation axis, comprising a support carrier, a braking band comprising two flanges connected by a plurality of connection elements which define ventilation channels for the braking band, at least one drive element able to connect the support carrier and the braking band to each other. The connection elements have a variable resistant section in an axial direction parallel to the rotation axis, the resistant section being measured in an area substantially parallel to the direction of the air flow inside the ventilation channels. Such resistant section progressively increasing as it moves from a median resistant section towards the respective connection resistant sections of the connection element to the flanges.

26 Claims, 6 Drawing Sheets

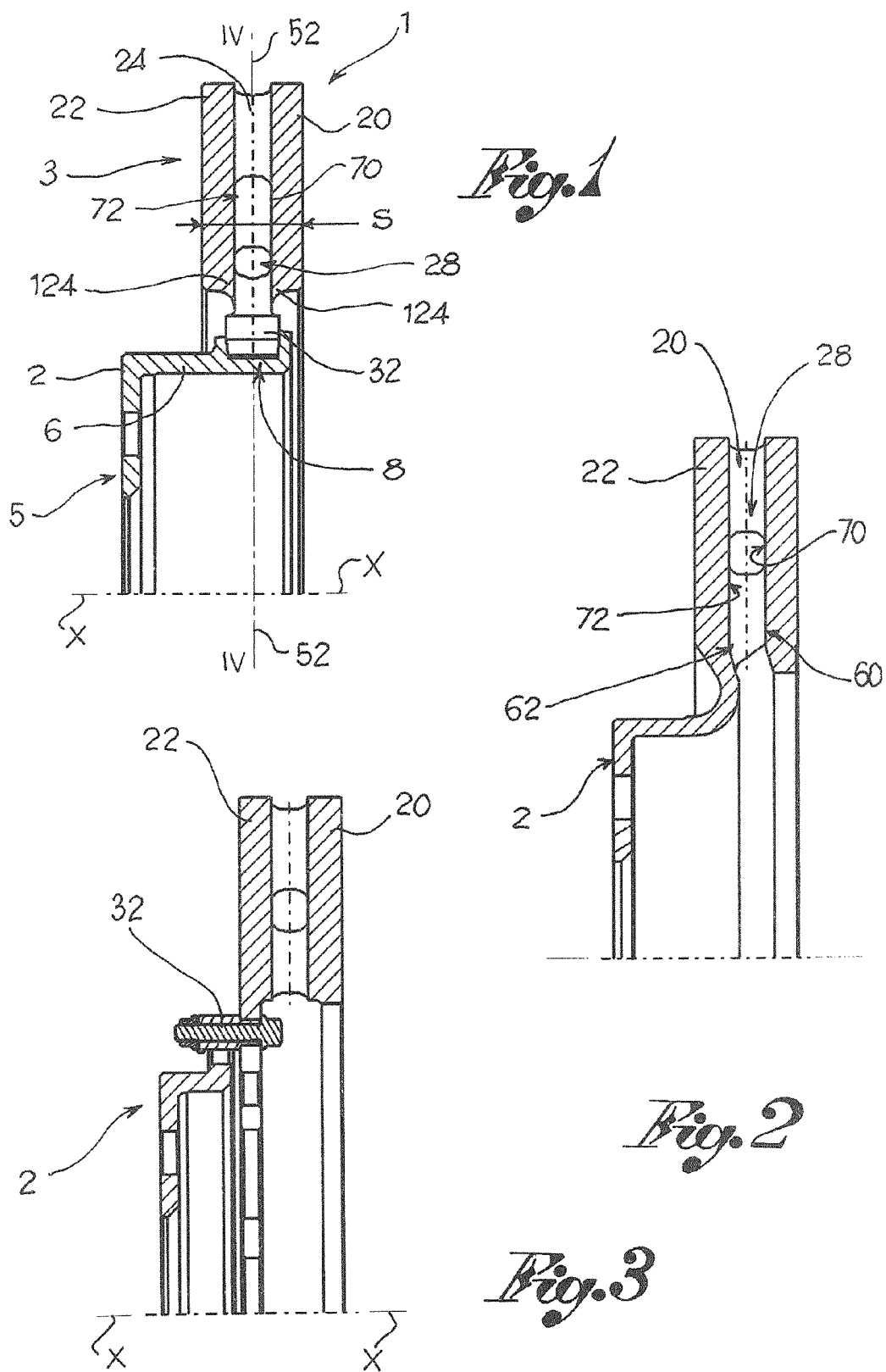

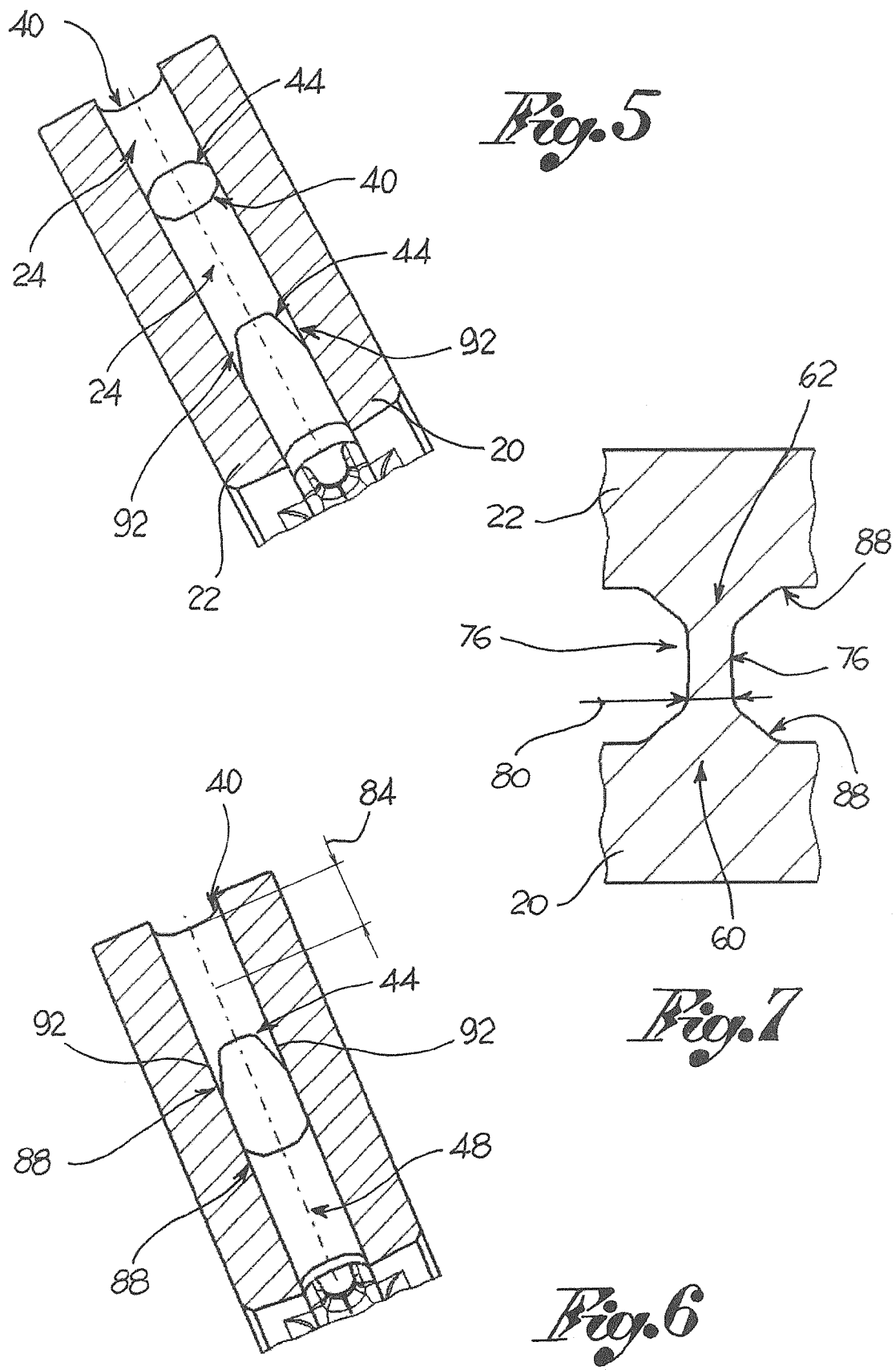

US 8,733,517 B2

BRAKE DISC VENTILATED

CROSS-REFERENCE TO RELATED APPLICATIONS

This application is a 371 U.S. National Stage of International Application No. PCT/IB2010/053311, filed Jul. 20, 2010. This application claims the benefit of Italian Patent Application No. PD2009A000240, filed Aug. 7, 2009. The disclosures of the above applications are incorporated herein by reference.

FIELD OF THE INVENTION

The present invention relates to a brake disc for vehicles, in particular for motor vehicles.

BACKGROUND OF THE INVENTION

Brakes in general and disc brakes in particular, are able to slow down and/or stop the vehicle, transforming kinetic energy into heat energy by means of friction between the disc and pads. For such reason, to keep the brakes efficient, it is important not to overheat the disc and the pads. It is therefore important to achieve efficient heat dissipation into the environment.

To such purpose brake discs are known of comprising a pair of flanges placed side by side which comprise in turn external friction surfaces and internal ventilation channels.

The flanges are connected to each other by connection elements, which may be pins or tongues. Preferably, the connection elements are shaped so as to form internal ventilation channels to cool the brake disc.

The disc comprises a support carrier for said braking band, the support carrier being destined to be coupled to the wheel hub of the vehicle, and being connected to the braking band by drive elements.

Such discs of the prior art are not without defects.

It has in fact been noted that the ventilation of the disc achieved by the discs of the prior art is not optimal and that the consequent dissipation of heat is not fully efficient.

Such scarce dissipation efficiency is due essentially to the width and shape of the connection elements which identify and delimit the internal ventilation channels: such connection elements do not allow optimal air flow.

In fact, the connection elements have both the function of delimiting the ventilation channels and the function of mechanically connecting the flanges to each other. To guarantee a sufficiently resistant section or connection between the flanges, such connection elements have significant overall dimensions in relation to the braking band.

The increase in the resistant section of the connection elements however causes a reduction in the section of the ventilation channels as well as an increase in the mass and gyroscopic effect of the brake disc.

The solutions of the prior art do not permit the contemporary optimisation of ventilation efficiency with a reduction in mass of the discs.

SUMMARY OF THE INVENTION

The purpose of the present invention is to devise and make available a brake disc which overcomes the drawbacks complained of with reference to the prior art.

In particular, the task of the present invention is to make available a brake disc which guarantees ventilation and therefore optimal heat dissipation and at the same time a reduction of the mass of the disc itself.

Such purpose and such task are achieved by the brake discs according to the attached independent claims.

BRIEF DESCRIPTION OF THE DRAWINGS

Further characteristics and advantages of the brake disc according to the invention will be clear from the description given below, made by way of a non limiting example of its preferred embodiments with reference to the attached drawings, wherein:

FIGS. 1-3 show cross-section views of a brake disc according to some embodiments of the present invention;

FIG. 5 shows a cross-section view of the brake disc in FIG. 1, along the section plane V-V in FIG. 4;

FIG. 6 shows a cross-section view of the brake disc in FIG. 1, along the section plane VI-VI in FIG. 4;

FIG. 7 shows a cross-section view of the brake disc in FIG. 1, along the section plane VII-VII in FIG. 4;

DETAILED DESCRIPTION OF THE INVENTION

Figure 4:
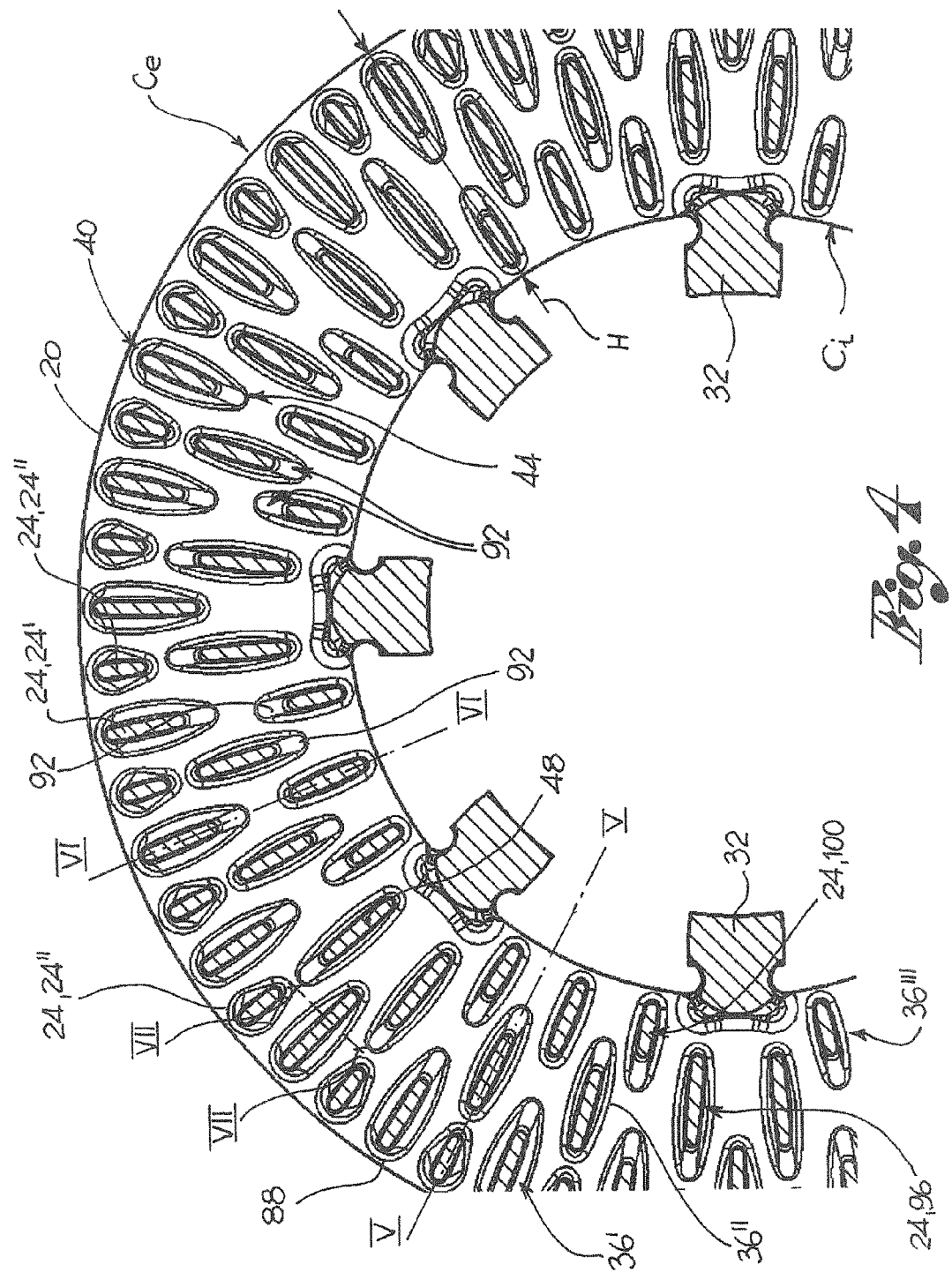
FIG. 4 shows a partial cross-section view of the brake disc in FIG. 1, along the section plane IV-IV in FIG. 1.
Figure 8:
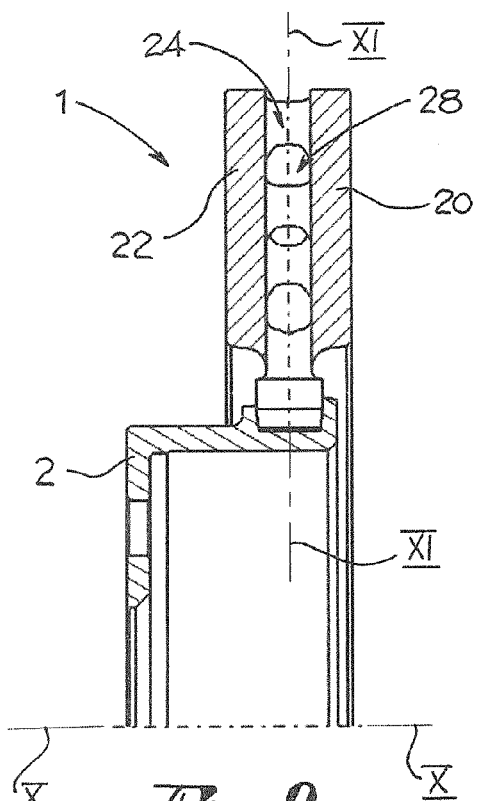
FIGS. 8-10 show cross-section views of a brake disc according to further embodiments of the present invention.
Figure 9:
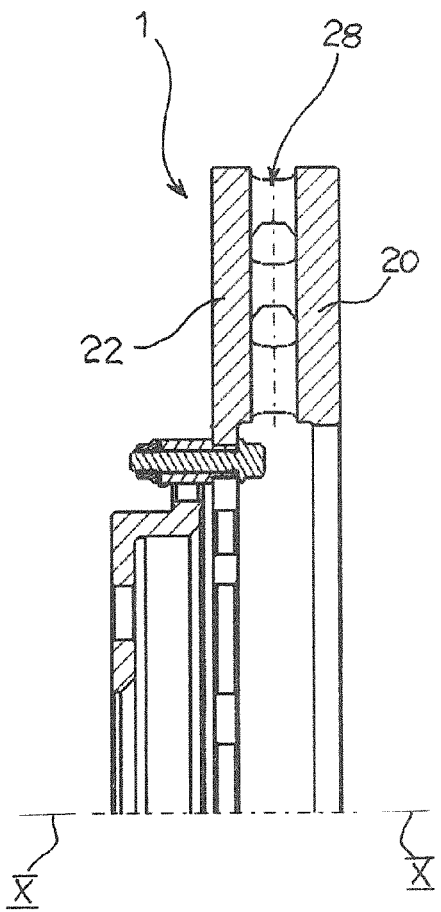
Figure 10:
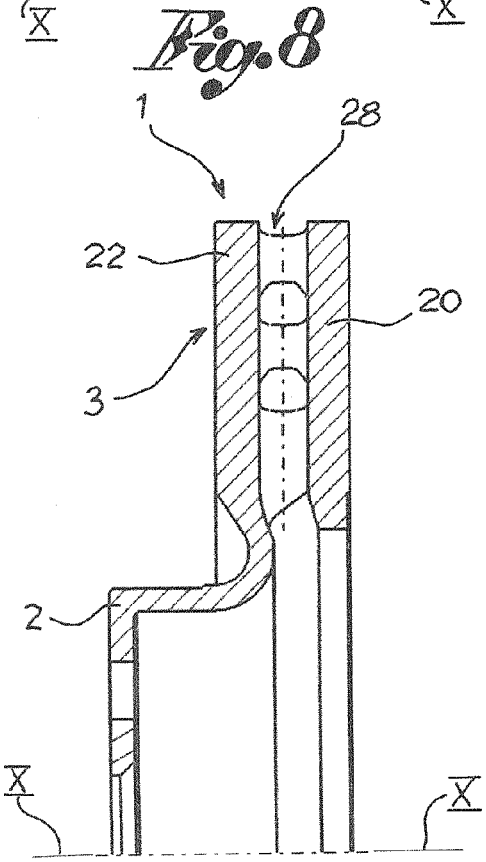

With reference to the aforesaid figures, reference numeral 1 globally denotes a brake disc according to the invention.

The brake disc 1 according to the invention comprises two parts which share a rotation axis X. A first inner part, the support carrier 2, is destined to be coupled to the wheel hub of a vehicle, while the remaining peripheral part, the braking band 3, is destined to co-operate with the associable calliper of the brake disc positioned astride the brake disc 1 to exert a braking effect on the vehicle.

The support carrier 2 comprises a central portion 5 destined to be coupled, for example in a conventional manner, to the wheel hub of a vehicle and a peripheral annular portion 6 which juts out and overhangs the central portion 5, for example in a direction substantially parallel to the rotation axis X-X of the brake disc.

The support carrier 2 comprises radial seats 8 made in the peripheral annular portion 6.

The braking band 3 comprises an annular disc of a predefined thickness S and height H, which is coaxially supported by the peripheral annular portion 6 of the support carrier 2. The braking band 3 is destined to co-operate with the callipers of the brake disc to exert a braking effect on the vehicle.

The braking band 3 is, in a manner known in itself, of the ventilated type. The ventilated band 3 comprises two flanges 20 and 22 connected by a plurality of connection elements 24. The connection elements 24 define ventilation channels 28 for the passage of a flow of cooling air over the braking band 3.

As will be described further below, the brake disc 1 comprises at least one drive element 32 able to connect the support carrier 2 and the braking band 3 to each other so as to transmit the braking forces exchanged by the braking band 3 and the calliper, to the hub.

With reference to the brake disc 1 and to its rotation axis X-X:
- "axial" is defined as any direction parallel to said axis X;
- "radial" is defined as any direction perpendicular to the axis X and incident with it, and
- "circumferential" or "tangential" the direction of any circumference centred on said axis X and lying on a normal plane to it, or the direction of a tangent of the same.

The braking band 3 is a circular crown delimited by an inner radial circumference or rim Ci and by an outer radial circumference or rim Ce.

The connection elements 24 are preferably arranged in ranks or rows 36 along the circular crown of the braking band 3.

The connection elements 24 of each row 36 extend from an outer radial extremity 40, facing towards the outer radial rim Ce of the braking band 3, to an inner radial extremity 44 facing towards the inner radial rim Ci of the braking band 3.

According to one embodiment, the inner radial extremities 44 of one row 36',36" are positioned on the same circumference as the outer radial extremities 40 of the radial row 36"',36"" directly adjacent on the side of the inner radial rim Ci.

Advantageously, the connection elements 24 have a resistant section variable in an axial direction parallel to the rotation axis X-X, said resistant section being measured in relation to an area substantially parallel to the direction of the air flow inside the ventilation channels 28.

The connection element 24 has a median resistant section 48 measured in relation to an area substantially parallel to the direction of the air flow inside the ventilation channels 28 of the braking band 3.

The connection element 24 has a connection resistant section 60,62 on an inner lateral face 70,72 of a respective flange 20,22, said connection resistant section 60,62 being measured in relation to an area substantially parallel to the direction of the air flow inside the ventilation channels 28 of the braking band 3.

According to one embodiment, the resistant section of the connection element 24 increases progressively from the median resistant section 48 towards the respective connection resistant sections 60, 62.

According to a further embodiment, the resistant section has a central section with a constant median resistant section, said resistant section increasing progressively as it moves towards the respective connection resistant sections 60, 62.

Preferably, the connection elements 24 have a minimum cross-section at the median resistant section 48 and are symmetrical in relation to the centre line plane 52 of the brake disc 1.

According to one embodiment, the connection elements 24 have a mainly radial extension, passing through the rotation axis X-X of the brake disc 1, and the resistant section of such connection elements 24 increases at the lateral faces 76 of the connection elements 24 positioned on sides opposite the main radial extension of the element itself.

According to a preferred embodiment, the resistant section of the connection element 24 has a maximum tangential thickness 80 at a radial centre line 84 of the element itself. The tangential thickness 80 is measured in a tangential direction perpendicular to the axial direction and radial direction.

Radial centre line is taken to mean the intermediate distance between the outer radial extremity 40 and inner radial extremity 44 of the connection element 24.

Preferably, at the connection resistant section 60, 62, the connection element 24 comprises a perimetral attachment section 88 to the respective flange 20, 22.

Said perimetral section 88 interests solely the resistant sections connected to the respective flanges 20, 22: in other words, the perimetral section 88 constitutes a further and separate increase of the resistant section of the connection elements, localised on the attachment sections to the flanges.

According to one embodiment, the connection elements comprise at least one extension 92 which extends radially at an inner or outer radial extremity 40, 44 of the connection elements 24, said extension 92 increasing the resistant section of the connection element 24.

Preferably said extension 92 extends axially from at least one inner lateral face 70, 72 of a flange 20, 22 as far as the median resistant section 48 of the connection element 24 so as to radially reduce the resistant section of the connection element 24 moving from the inner lateral face 70, 72 towards the centre line 52 of the brake disc 1.

Preferably, the extension 92 is symmetrical in relation to a centre line plane 52 of the brake disc 1.

According to one embodiment, the flanges 20,22 comprise three rows 36 of connection elements 24, respectively a radially external row 36' next to the outer radial rim Ce of the flanges 20,22, a radially internal row 36"' next to an inner radial rim Ci of the flanges 20,22, an intermediate row 36" radially positioned between said external and internal rows 36',36"', said rows 36',36",36"' angularly brushing the entire circumference of the flanges 20,22.

According to one embodiment, the radially external row 36' comprises first and second connection elements 24',24", the first connection elements 24' having a main radial extension and the second connection elements 24" having a lesser radial extension or half the radial extension of the first connection elements 24' (FIGS. 4,5).

Figure 11:
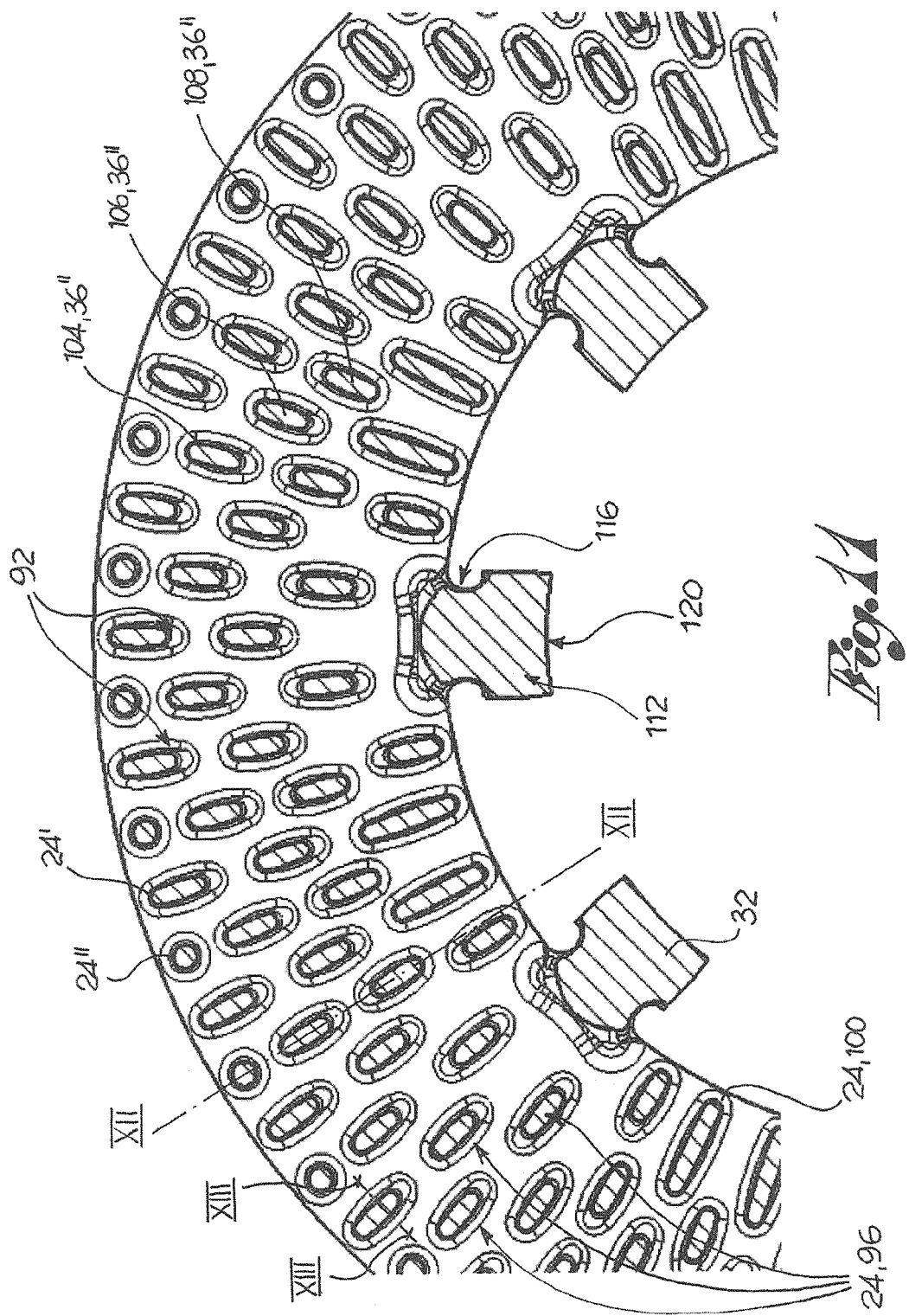
FIG. 11 shows a partial cross-section view of the brake disc in FIG. 8, along the section plane XI-XI in FIG. 8.
Figure 12:
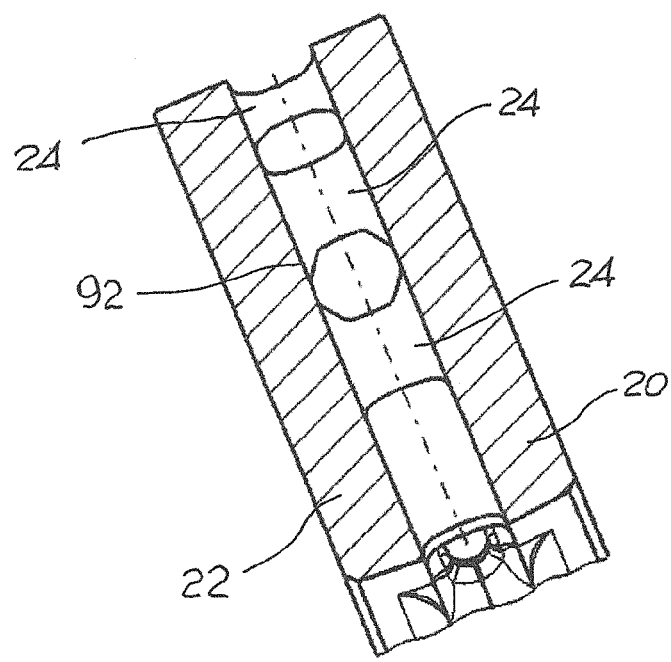
FIG. 12 shows a cross-section view of the brake disc in FIG. 8, along the section plane XII-XII in FIG. 8.
Figure 13:
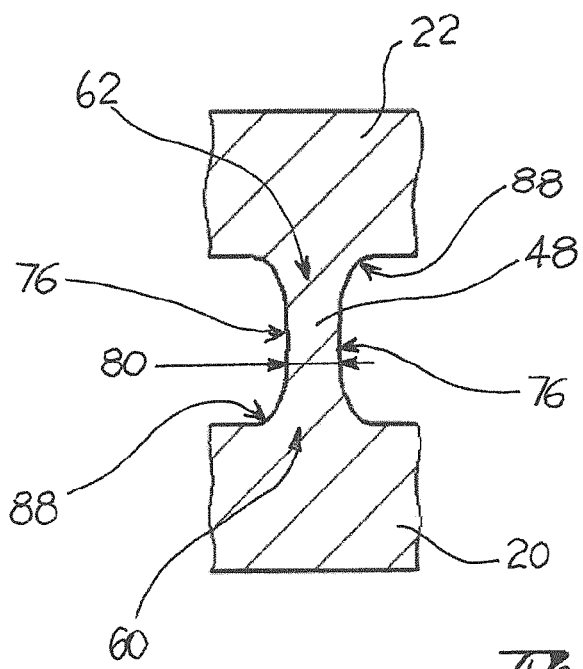
FIG. 13 shows a cross-section view of the brake disc in FIG. 8, along the section plane XIII-XIII in FIG. 8.

According to a further embodiment, said second connection elements 24" are pins having a circular cross-section (FIGS. 11, 12).

Preferably, the first connection elements 24' comprise extensions 92 at the inner radial extremities 44.

According to one embodiment, the radially intermediate row 36" comprises intermediate connection elements 96 fitted with radial extensions 92 at the inner radial extremities 44.

Preferably, the intermediate connection elements 96 are angularly aligned with the second connection elements 24" of the radially external row 36'.

The term angular alignment is taken to mean that the connection elements 24 are situated at different radial distances from the rotation axis X-X of the brake disc 1, and are substantially aligned along the same radius passing through said rotation axis X-X.

According to a further embodiment, the connection elements 24 of the radially intermediate row 36", positioned in an angular sector of the braking band 3 which comprises a drive element 32, are fitted with radial extensions 92 at the outer radial extremities 40 and are lacking radial extensions 92 on the respective inner radial extremities 44.

The term angular sector is taken to mean a portion of the braking band 3 delimited angularly by a pair of radii passing through the rotation axis X-X; in the case in point, the phrase "angular sector which comprises a drive element 32" means an angular sector delimited by a pair of radii which are at least tangent to tangential extremities of said drive element 32.

According to one embodiment (FIGS. 4-5) the radially internal row 36"' comprises groups of three inner connection elements 100 positioned angularly between two consecutive drive elements 32; preferably, the two inner connection elements 100 adjacent to said consecutive drive elements 32 are fitted with radial extensions 92 on the respective outer radial extremities 40.

Preferably, the inner connection elements 100 are angularly aligned with the first connection elements 24' of the radially external row 36'.

According to a further embodiment (FIGS. 11-12), the radially intermediate row 36" comprises in turn a first, second and third inner row 104,106,108, staggered angularly to each other, wherein the first inner row 104 and the third inner row 108 are angularly aligned with the second connection elements 24" of the external row 36', while the second inner row 106 is angularly aligned with the first connection elements 24' of the external row 36'.

Preferably, the intermediate connection elements 96 of the first inner row 104 comprise extensions 92 on the inner radial extremities 44 and the intermediate connection elements 96 of the third inner row 108 comprise extensions 92 on the outer radial extremities 40 directly facing the extensions 92 of the first inner row 104.

According to one embodiment, the intermediate connection elements 96 of the second inner row 106 comprise extensions 92 on the inner radial extremities 44.

According to one embodiment (FIGS. 11-12) the radially internal row 36''' comprises groups of four inner connection elements 100 angularly positioned between two consecutive drive elements 32; preferably the two inner connection elements 100 adjacent to said consecutive drive elements 32 are fitted with radial extensions 92 on the respective outer radial extremities 40.

Preferably, the inner connection elements 100 adjacent to the consecutive drive elements 32 are angularly aligned with the second connection elements 24" of the radially external row 36'.

According to one embodiment, the inner connection elements 100 not facing the consecutive drive elements 32 are angularly aligned with the first connection elements 24' of the radially external row 36'.

As mentioned, the brake disc 1 comprises drive elements 32 destined to bind the braking band 3 to the support carrier 2. Such drive elements 32 are preferably made in one piece with the braking band 3.

The drive elements 32 are at least partially housed in the special radial seats 8 made in the radial rim of the support carrier 2.

The drive elements 32 comprise a drive body 112 delimited at opposite ends by a bottom 116 and by a protrusion 120.

Advantageously, the drive body 112 has a smaller axial dimension than the axial dimension of the ventilation channel closed between the flanges 20, 22.

The protrusion 120 is destined to be inserted in the special radial seat 8 made in the support carrier 2, while the bottom 116 forms a mechanical coupling, preferably in one piece, between the drive element 32 and the braking band 3.

According to one embodiment of the invention, the protrusion 120 is housed inside the seat 8 so as to be restrained in a tangential direction and axial direction while being free to slide in a radial direction.

For example, the drive elements 32 comprise a protrusion 120 having the shape of a prismatic protrusion with a substantially quadrangular cross-section, suitable for being at least partially housed in the seats 8 to couple the braking band 3 to the support carrier 2 in rotation.

The coupling of the protrusion 120 with the seat 8 is not an interference coupling but rather provides for some play, even though extremely limited: consequently the radial movement of the individual protrusion 120 inside the individual seat 8 is not obstructed by anything.

The protrusions 120, resting on the walls of the respective seats 8, are able to transmit the braking torque from the band 3 to the carrier 2.

The bottoms 116 rather have the task of anchoring the drive element 32 to the braking band 3 and of channelling the braking forces exerted by friction on the two flanges 20 and 22, so as to transfer them to the protrusions 120 to then transmit them to the carrier 2.

The bottoms 116 of the drive elements 32 according to the invention, are a special Y or T shape.

In particular, next to the bottoms 116, where they engage with the braking band 3, the drive elements 32 fork into a pair of branches 124, each firmly connected to a relative flange 20, 22 of the braking band 3.

Said branches 124 are preferably symmetrical in relation to the centre line plane 52 of the brake disc 1.

As may be seen from the above description, the brake discs according to the present invention make it possible to overcome the drawbacks mentioned with reference to the brake discs of the prior art.

Advantageously, the shape of the connection elements makes it possible to ensure a solid structural connection between the flanges while at the same time limiting the mass and gyroscopic effect of the braking band.

Moreover, the wider shape of the connection elements creates ventilation channels locally having a converging and diverging progress which amplifies the ventilation and thereby cooling of the flanges.

The radial extensions provided on the radial extremities of the connection elements help to facilitate the channelling of the air into the ventilation channels as far as its expulsion onto the outer circumference of the braking band.

The fact that the drive elements engage on both flanges makes for a considerable structural advantage compared to other known solutions in which the drive elements engage on a single flange.

In fact the engagement on both flanges enables the drive elements to gather the forces generated on the individual flange by the braking forces, without the need to transmit such forces from one flange to the other via the connection elements.

This way, the connection elements may be scaled, from a structural point of view, to resist mainly the sole compression force exerted by the calliper during the braking action. From a structural point of view, in the brake disc according to the invention, the connection elements are substantially not required to transmit other forces.

From a fluid dynamic point of view it should be noted how the particular shape of the drive elements makes it possible to give free access to the circulation of air inside all the ventilation channels.

Such solution is preferable to other known solutions in which the single drive element extends so that its bottom becomes a connection element (pin or tongue). In such type of known solution in fact, the need for structural order and fluid dynamic requirements conflict. The solution according to the invention however, in relation to the drive elements, makes it possible to advantageously separate the structural functions from the fluid dynamic functions.

In addition, the brake disc according to the present invention allows radial sliding between the connection elements, and therefore the braking band and the carrier. As a result any heat dilation caused by heating of the brake disc does not translate into a loss of perpendicularity between the braking band and the rotation axis of the disc.

A person skilled in the art may make modifications, adaptations and replace elements with others functionally equivalent to the embodiments of the brake discs described above so as to satisfy contingent requirements while remaining within the scope of protection of the invention as defined by following claims.

We claim:

1. A brake disc having a rotation axis, comprising:
   a support carrier, destined to be coupled to a wheel hub of a vehicle;
   a braking band, destined to co-operate with a disc brake calliper, comprising two flanges connected by a plurality of connection elements which define ventilation channels for the passage of a flow of cooling air over the braking band; and
   at least one drive element able to connect the support carrier and the braking band to each other so as to transmit the braking forces exchanged by the braking band and the calliper to the hub; wherein
   at least one connection element has a resistant section variable in an axial direction parallel to the rotation axis, said resistant section being measured in an area essentially parallel to the direction of the air flow inside the ventilation channels;
   the connection element having a median resistant section, measured in relation to an area substantially parallel to the direction of the air flow inside the ventilation channels of the braking band;
   the connection element having a connection resistant section on an inner lateral face of a respective flange, said connection resistant section being measured in relation to an area essentially parallel to the direction of the air flow inside the ventilation channels of the braking band; and
   the resistant section of the connection element progressively increasing as it moves from the median resistant section towards the respective connection resistant sections.

2. The brake disc according to claim 1, wherein the flanges comprise three rows of connection elements, respectively a radially external row next to an outer radial rim of the flanges, a radially internal row next to an inner radial rim of the flanges, a radially intermediate row radially positioned between said radially external and internal rows, said rows angularly brushing the entire circumference of the flanges.

3. The brake disc according to claim 2, wherein the radially intermediate row comprises intermediate connection elements fitted with radial extensions at the inner radial extremities, said intermediate connection elements being angularly aligned with the second connection elements of the radially external row.

4. The brake disc according to claim 2, wherein the radially intermediate row comprises in turn, a first, second and third inner row, staggered angularly, wherein the first inner row and the third inner row are angularly aligned with the second connection elements of the external row, while the second inner row is angularly aligned with the first connection elements of the external row.

5. The brake disc according to claim 4, wherein the intermediate connection elements of the first inner row comprises extensions on the inner radial extremities and the intermediate connection elements of the third inner row comprise extensions on the outer radial extremities directly facing the extensions of the first inner row.

6. The brake disc according to claim 4, wherein the intermediate connection elements of the second inner row comprise extensions on the inner radial extremities.

7. The brake disc according to claim 1, wherein the connection elements comprise at least one extension which extends radially at a radial extremity of the connection elements, said extension reducing the resistant section of the connection element.

8. The brake disc according to claim 7, wherein said extension extends axially from at least one inner lateral face of a flange as far as the median resistant section of the connection element so as to radially reduce the resistant section of the connection element moving from the inner lateral face towards the centreline of the brake disc.

9. The brake disc according to claim 7, wherein said extension is symmetrical in relation to the centreline of the brake disc.

10. The brake disc according to claim 1, wherein the radially external row comprises first and second connection elements, the first connection elements having a main radial extension and the second connection elements having a lesser radial extension or half the radial extension of the first connection elements.

11. The brake disc according to claim 10, wherein said second connection elements are pins with a circular cross-section.

12. The brake disc according to claim 10, wherein the first connection elements comprise extensions at the inner radial extremities.

13. The brake disc according to claim 1, wherein the radially internal row comprises groups of four inner connection elements angularly positioned between two consecutive drive elements, the two inner connection elements adjacent to said consecutive drive elements being fitted with radial extensions on the respective outer radial extremities.

14. The brake disc according to claim 13, wherein said inner connection elements adjacent to the consecutive drive elements are angularly aligned with the second connection elements of the radially external row.

15. The brake disc according to claim 13, wherein the inner connection elements not facing the consecutive drive elements are angularly aligned with the first connection elements of the radially external row.

16. The brake disc according to claim 1, wherein the radially internal row comprises groups of three inner connection elements angularly positioned between two consecutive drive elements, the two inner connection elements adjacent to said consecutive drive elements being fitted with radial extensions on the outer radial extremities.

17. The brake disc according to claim 16, wherein said inner connection elements are angularly aligned with the first connection elements of the radially external row.

18. The brake disc according to claim 1, wherein said resistant section is disposed within a plane located approximately midway between the two flanges of the braking band.

19. The brake disc according to claim 18, wherein the area of said resistant section progressively increases in a first direction from the median resistant section towards the respective connection resistant sections, the first direction being essentially parallel to the direction of air flow through the ventilation channels of the braking band.

20. The brake disc according to claim 1, wherein the connection elements have a minimum cross-section at the median resistant section and are symmetrical in relation to the centre line plane of the brake disc.

21. The brake disc according to claim 1, wherein the resistant section of the connection elements has a central section with a constant median resistant section, said resistant section progressively increasing as it moves towards the respective connection resistant sections.

22. The brake disc according to claim 1, wherein the connection elements have an essentially radial extension, passing through the rotation axis of the brake disc, and the resistant section of the connection element increases at the lateral faces of the connection elements, positioned on sides opposite the main radial extension of the element itself.

23. The brake disc according to claim 1, wherein the resistant section of the connection element has a maximum tangential thickness at the radial centreline of the element itself, the tangential thickness being measured in a tangential direction perpendicular to the axial direction and radial direction.

24. The brake disc according to claim 1, wherein the connection elements of each row extend from an outer radial extremity, facing towards the outer radial rim of the flanges, to an inner radial extremity, facing towards the inner radial rim of the flanges, wherein the inner radial extremities of one row are positioned on the same circumference as the outer radial extremities of the radial row directly adjacent on the side of the inner radial rim.

25. The brake disc according to claim 1, wherein the connection elements of the radially intermediate row, positioned in an angular sector of the braking band which comprises a drive element, are fitted with radial extensions at the outer radial extremities and are lacking radial extensions on the respective inner radial extremities.

26. The brake disc according to claim 1, wherein said drive elements comprise a drive body which extends from a bottom to a protrusion, the bottom being connected to the braking band and the protrusion being at least partially inserted in a special seat of the carrier, the bottom having a 'Y' configuration with a pair of branches, each branch being connected to a relative flange of the braking band.

* * * * *